Feb. 20, 1962 T. R. SMITH Re. 25,125

FLUID CONTROL SYSTEM FOR WASHING MACHINE

Original Filed Dec. 27, 1955 4 Sheets-Sheet 1

Inventor
Thomas R. Smith
by James S. Nettleton
Attorney

FLUID CONTROL SYSTEM FOR WASHING MACHINE

Original Filed Dec. 27, 1955 4 Sheets-Sheet 2

Inventor
Thomas R. Smith
by James S. Nettleton
Attorney

FLUID CONTROL SYSTEM FOR WASHING MACHINE

Original Filed Dec. 27, 1955 4 Sheets-Sheet 3

Inventor
Thomas R. Smith
by James S. Nettleton
Attorney

FLUID CONTROL SYSTEM FOR WASHING MACHINE
Original Filed Dec. 27, 1955 4 Sheets-Sheet 4
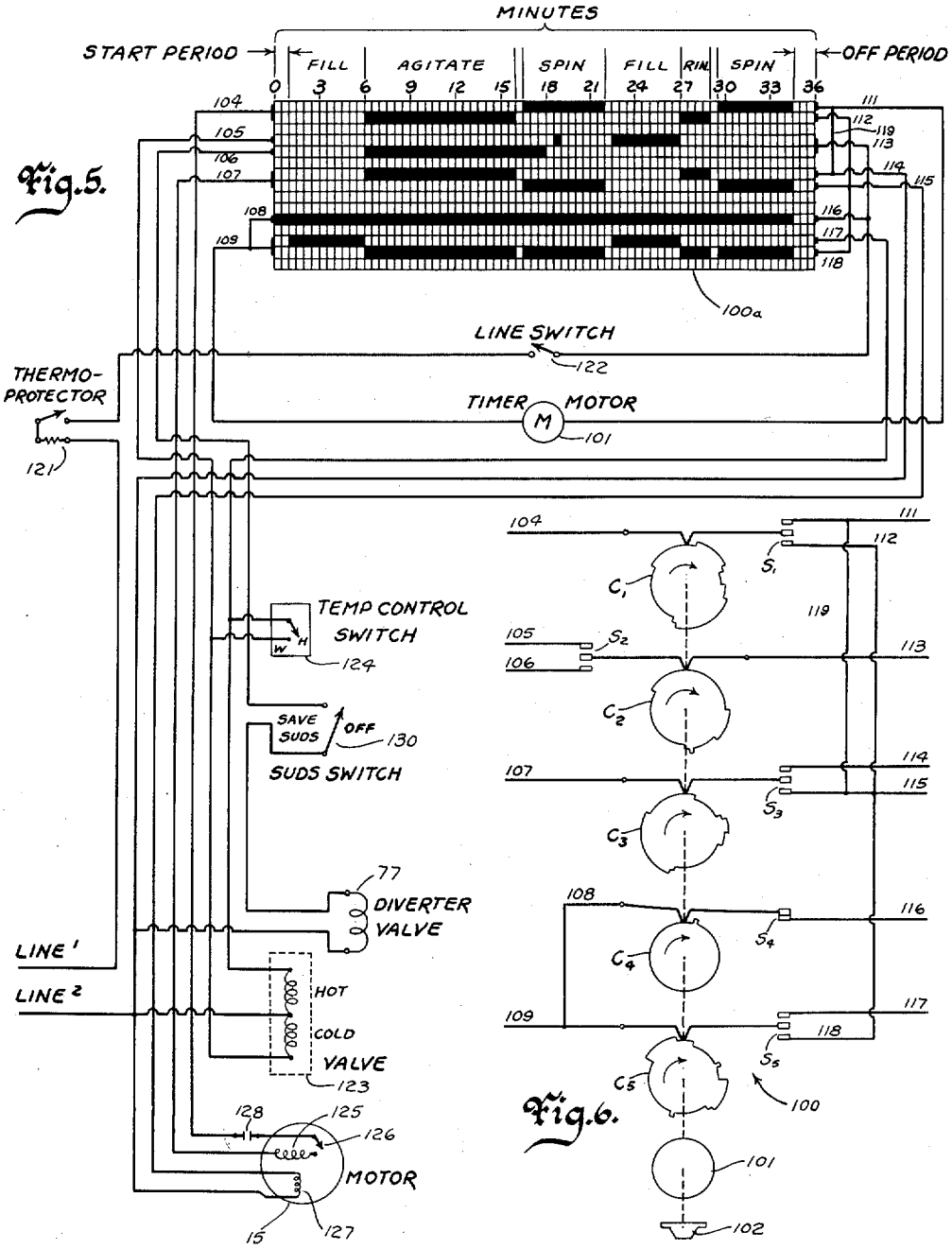
Inventor
Thomas R. Smith
by James S. Nettleton
Attorney United States Patent Office Re. 25,125
Reissued Feb. 20, 1962

25,125

FLUID CONTROL SYSTEM FOR WASHING MACHINE

Thomas R. Smith, Newton, Iowa, assignor to The Maytag Company, Newton, Iowa, a corporation of Delaware Original No. 2,923,144, dated Feb. 2, 1960, Ser. No. 555,321, Dec. 27, 1955. Application for reissue June 13, 1961, Ser. No. 120,123
14 Claims. (Cl. 68—12)

Matter enclosed in heavy brackets [ ] appears in the original patent but forms no part of this reissue specification; matter printed in italics indicates the additions made by reissue.

This invention relates to a suds saving control system for automatic washing machines. It is specifically directed to a washing machine powered by a reversible motor which when energized in one direction effects a washing operation within its tub assembly and which when reversed effects a centrifugal extraction operation within that same tub assembly. During the washing operation a water pump communicating with the tub assembly is driven by the reversible motor in one direction to pump washing fluid toward the tub assembly while during the centrifugal operation following the first washing operation, the motor is reversed not only to effect the centrifugal extraction process but also to pump sudsy washing fluids from the tub assembly through a diverter valve to either an exterior drain or to a suds reservoir for reuse as determined by the option of the operator. The control system further permits the suds pumped to the suds reservoir to be returned to the tub assembly for reuse during a subsequent washing operation in accordance with the desires of the operator.

In this invention the pumping of the washing fluid to and from the tub assembly is jointly controlled by a manually operated switch which conditions the suds saving device for operation and by a presettable timer mechanism which governs the time and duration of energization of that suds saving device. While a diverter valve controlled by the timer mechanism and the manually operated switch is used to regulate communication between the tube assembly and the suds reservoir, no shifting devices are necessary to control the direction of suds flow which is regulated by a reversible motor under the control of the timer mechanism.

In the accompanying drawings:

FIGURE 5 is an electrical wiring diagram of the control system controlling the operation of the washing machine illustrated in FIGURE 1; and FIGURE 6 is a simplified representation of a timer assembly controlling the programmed sequence illustrated in FIGURE 5.

Figure 1:
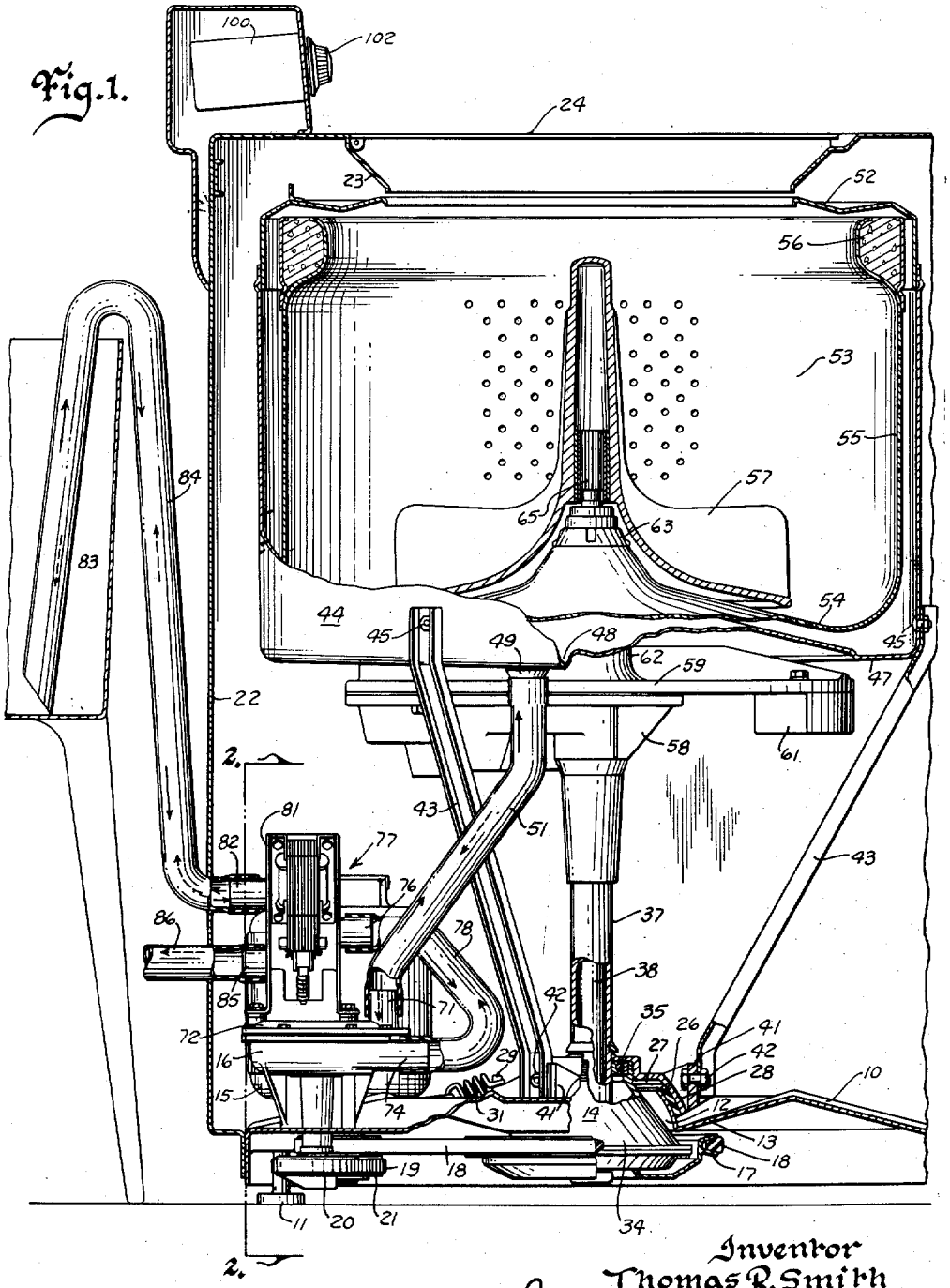
FIGURE 1 is a side elevational view, partially broken away, showing a washing machine embodying my invention.

Referring now to the accompanying drawings there is shown a base member 10 mounted on adjustable feet 11 and provided with a supporting dome 12 rising out of a centrally located depression 13 in the base frame 10. Dome 12 serves as a mounting for a drive assembly 14 such as that disclosed in the John D. Goodlaxson application Serial No. 505,231, filed May 2, 1955, *now Patent No. 2,948,372*, and assigned to the same assignee as that of the instant application.

Base frame member 10 also supports the upended reversible motor 15 and the two-way centrifugal water pump 16. Pulley 17, serving as the input member for drive assembly 14, is powered through belt 18 while belt 19 drives pulley 20 of water pump 16. Both belts 18 and 19 are driven in the same direction by the double pulley 21 carried on drive shaft of reversible motor 15 beneath base member 10.

Cabinet 22, attached to and enclosing base 10 together with the drive and tub assemblies supported thereby, is provided at its upper end with a depending annular flange 23 defining an access opening into the washing machine apparatus which is normally covered by the access door 24.

In FIGURE 1 it can be seen that dome 12 in base members 10 is provided with friction pads 26 on its periphery adjacent the aperture 27 in its uppermost portion. An umbrella-like member 28 rests on the friction pads 26 and is provided with three equally spaced ears 29 accommodating three centering springs 31 which are connected to base frame 10. This arrangement centers support member 28 on dome 12 and restrains it from rotation during the operation of drive assembly 14.

Threaded into the umbrella support member 28 is a member 34 of substantially frusto-conical configuration which serves as a housing for the drive assembly 14 of the previously identified Goodlaxson application, Serial No. 505,231. Housing member 34 cooperates with the umbrella support member 28 by gripping the outer race of a thrust bearing 35 which is provided with a tapered inner race.

Mating with and seated in this tapered inner race of bearing 35 is the spin tube or shaft 37 which journals a power shaft 38 also extending into the drive assembly 14. With this construction all weight placed on spin tube 37, housing member 34 and on umbrella member 28 may be used to an advantage to provide ample frictional forces between umbrella member 28 and the friction pads 26 for dampening nutational movements of the shafts 37 and 38 relative to dome 12 while permitting rotational movement of spin tube 37 in thrust bearing 35.

While the precise details of the Goodlaxson drive assembly forming the basis for the previously identified application Serial No. 505,231 are not essential to the construction of the instant invention, its operation can be briefly explained for environmental purposes. Upon energization of motor 15 in a direction to rotate the pulley 18 in a counterclockwise direction as viewed from the bottom of FIGURE 1, power shaft 38 is rotated in the same direction while spin shaft 37 is held against rotation by appropriate braking mechanism within housing 34. Upon the reversal of motor 15, spin shaft 37 is released for rotation to allow both shafts 37 and 38 to be spun in unison in a clockwise direction.

With the drive and support construction set forth above, it can be seen that shafts 37 and 38 may be selectively rotated as determined by the direction of rotation imparted to pulley 18 while permitting their nutation about a vertical axis at all times. In the embodiment set forth in the accompanying drawings, shafts 37 and 38 nutate on a point determined by the intersection of the vertical axis of rotation with a horizontal plane bisecting the groove of driven pulley 17.

Figure 2:
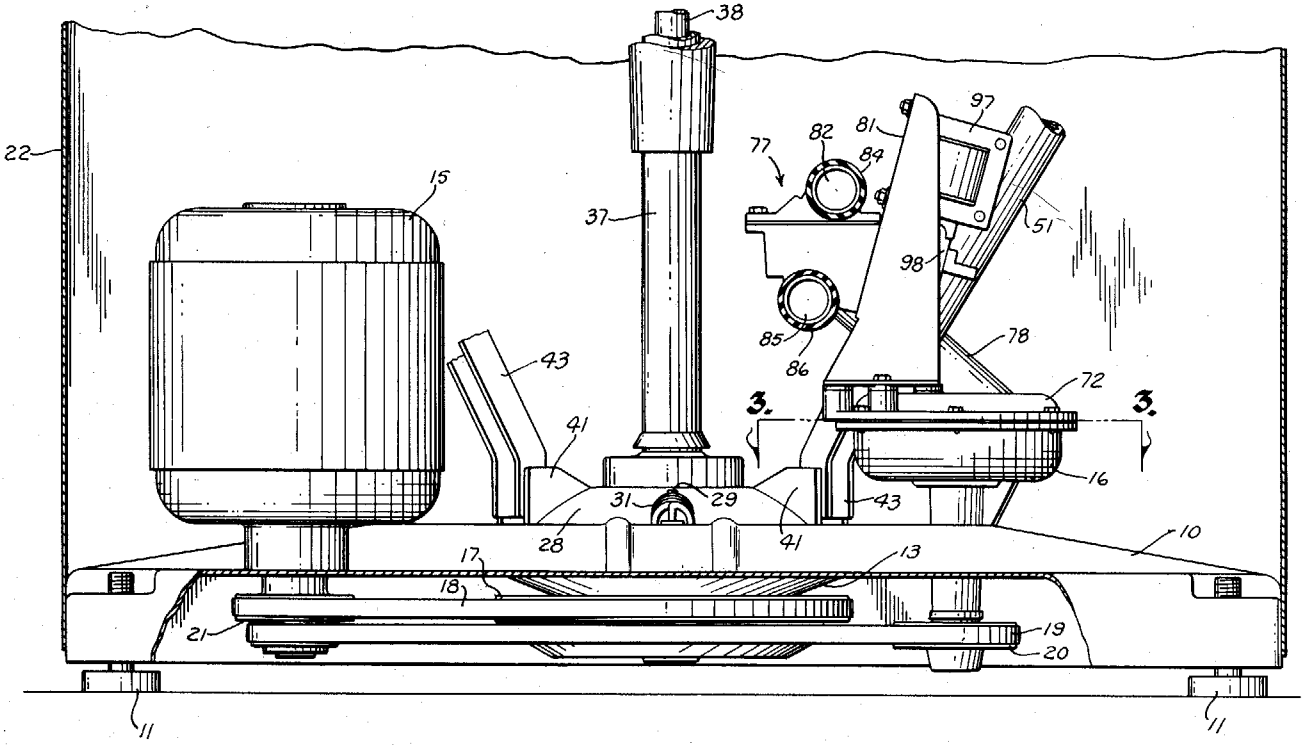
FIGURE 2 is an enlarged view taken on line 2—2 of FIGURE 1.

With reference to the general details of the tube assembly, it will be noted that umbrella support member 28 is provided with recessed upstanding lugs 41 spaced equally from each other and alternately around member 28 with respect to ears 29. While not entirely obvious from FIGURE 1, it will be apparent from this description that there are three lugs 41 spaced 120° from each other each of which in turn is 60° removed from an adjacent ear 29 as more clearly shown in FIGURE 2.

Fastened within the recessed lugs 41 by connectors 42 are the three tub brace members 43 which are, in this embodiment, of channel-like cross section. Brace members 43 extend outwardly and upwardly from umbrella support member 28 to join the nonrotatable tub 44 through tube connectors 45 to form an inverted tripod support for tub 44. The tub 44 is provided with a bottom wall 47 in wh'ch is formed a C-shaped gutter 48 having its lowermost portion converging into the drain outlet 49 which in turn communicates with water pump 16 through the flexible drain hose 51.

The nonrotatable outer tub 44 is provided with a removable crown 52 which permits removal of the rotatable inner basket or tub 53 nested within outer tub 44. Inner tub 53 has a perforate bottom wall 54 and a perforate cylindrical sidewall 55 which carries a concrete balancing ring 56 at its uppermost end. A conventional oscillating type agitator 57 is mounted within the spinner basket 53 to provide the proper agitation of fabrics placed within the tub assembly as formed.

In order to drive agitator 57 during the washing periods and to spin basket 53 during the fluid extraction periods the following connections are provided. Spin tube 37, which extends into the drive assembly 14, carries affixed to its upper end the lower gear case cover 58 which in turn is bolted to the upper gear case cover 59 carrying counterweight 61 which counter balances a conventional motion converting unit housed between covers 58 and 59 and which is driven by power shaft 38.

In this illustrated embodiment upper gear case cover 59 is provided with an upstanding tubular extension 62 which is coaxial with spin tube 38 and which projects through a water tight radial bearing (not shown) in a center of the bottom wall 47 of the outer tub 44. Tubular extension 62 also extends through the center of bottom wall 54 of the basket 53 to accommodate a fastening nut 63 threaded on its upper end and cooperating with a shouldered support portion (not shown) of extension 62 abutting the lower side of wall 47 in order to support and fasten basket 53 onto extension 62. In the preferred construction this shouldered flange on extension 62 is of the same taper as the central re-entrant portion of basket 53 so that basket 53 is actually wedged onto its supporting flange by the tightening action of nut 63. It will be seen that with this construction basket 53 functionally becomes a unitary part of shaft 38 so that any movement imparted to power shaft 38 will also be imparted to basket 53.

Agitator 57 is constructed, in this embodiment, to oscillate in a conventional manner in response to the motions imparted to the splined agitator shaft 65 driven by the motion converting mechanism which is housed between covers 58 and 59 and which converts the rotary motion of the power shaft 38 into the desired oscillatory movements for agitator 57 to achieve a suitable washing action within the basket 53.

In accordance with the description to this point of the specification, it will be understood that upon rotation of pulley 17 by motor 15 in a counterclockwise direction as viewed from the bottom of FIGURE 1, spin shaft 37 will be restrained from rotation while power shaft 38 will impart an oscillatory movement to agitator 57. This, of course will thoroughly wash any soiled fabrics within basket 53 once tub 44 has been filled with the required amount of water and detergent. Upon reversal of motor 15, pulley 17 will drive both shafts 37 and 38 in a clockwise direction to spin tub 53 and agitator 57 in unison to effect an extraction of fluids from wet fabrics retained within basket 53. Unlike most domestic home laundry machines, fluids extracted through the perforate cylindrical sidewall 55 of basket 53 will not be thrown upwardly out of tub 44 but will be bumped down drain hose 51 by pump 16 by the fluid distribution system to be described.

Now with respect to the details of the suds distribution system, it will be noted from FIGURE 1 that drain hose 51 is connected to water pump 16 through the upstanding passageway 71 formed in the cover plate 72 and in a slightly bulbous portion formed in the lower body member of water pump 16. Pump 16 is provided with an impeller 73 (FIGURE 3) and a second horizontal pasageway 74 which communicates with port 76 of the diverter valve 77 through the short length of hose 78.

Diverter valve 77 is carried on the bracket 81 mounted on the pump cover plate 72 and is provided with a two piece housing. The upper housing piece defines a first effluent port 82 leading to the suds reservoir 83 through hose 84 while the lower housing piece defines a second effluent port 85 leading to an external drain (not shown) by way of hose 86.

Figure 4:
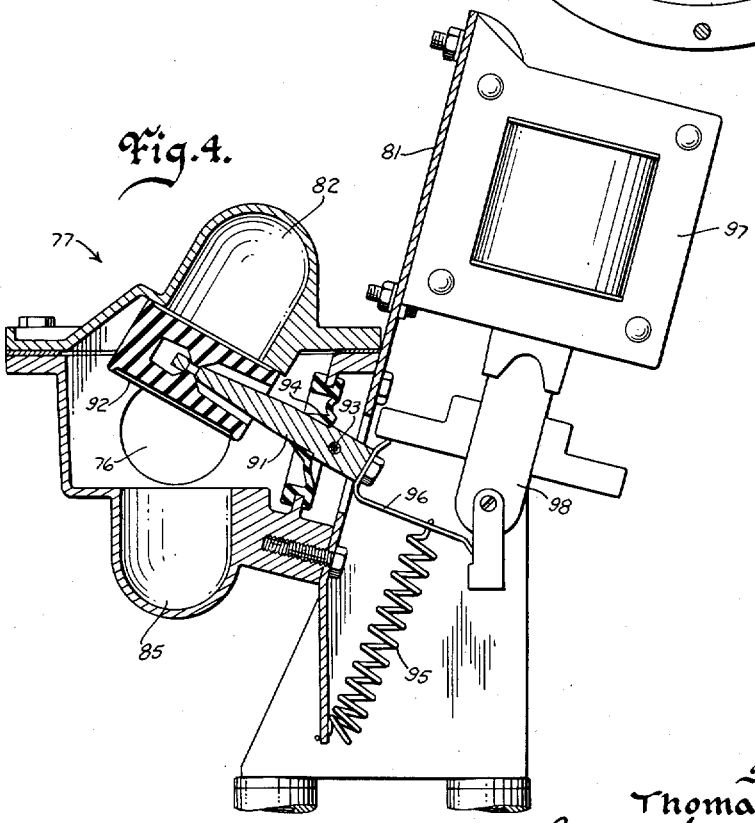
FIGURE 4 is an enlarged sectional view of the suds diverter valve incorporated in the suds saver system.

Diverter valve 77 includes a lever 91 which carries a valve flapper 92 and which is pivoted to the valve housing by means of the pivot pin 93 connected to the lower housing piece. Lever 91 passes through a flexible sealing diaphragm 94 in the valve housing and has an exterior spring tension 96 connected through spring 95 to bracket 81 to bias the flapper element 92 into the position shown in FIGURE 4 to close port 82 and prevent its communication with port 76 while permitting communication between port 76 and port 85. Energization of solenoid 97 with the resultant movement of armature 98 linked to lever extension 96 moves lever 91 to its extreme opposite position against the bias of spring 95 to open port 82 and permit its communication with port 76 while closing port 85 to thereby prevent the latter port from communicating with port 76.

Figure 3:
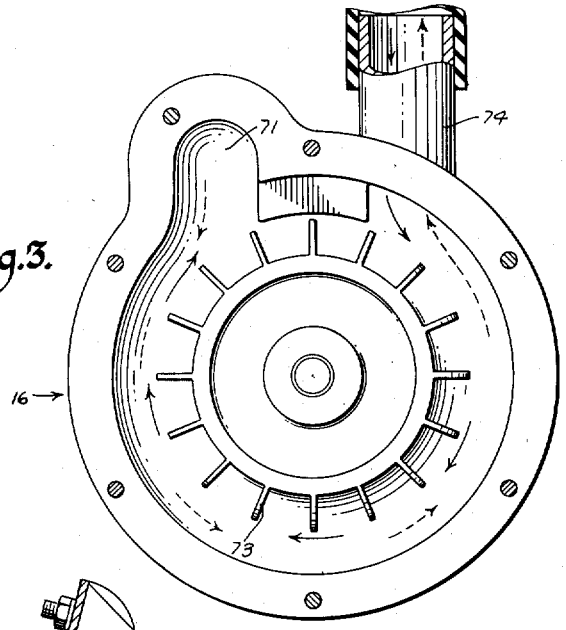
FIGURE 3 is an enlarged view taken on line 3—3 of FIGURE 2 showing the inside features of the two-way centrifugal pump used in the suds saver system.

This brief description of the pump 16 and diverter valve 77 should indicate that when pump pulley 20 is rotated in a counterclockwise direction by motor 15 as viewed from the bottom of FIGURE 1, pump impeller 73, which is directly driven by pulley 20, will rotate in a clockwise direction as viewed in FIGURE 3 so as to tend to pump fluid in the direction of the solid arrows shown in FIGURES 1 and 3. Upon reversal of motor 15, impeller 73 will tend to pump fluid in the opposite direction as shown by the dotted arrows of FIGURES 1 and 3. It will be understood that in pumping fluid from tub 44 as shown in dotted arrows of FIGURE 1 the fluid passing into port 76 of the diverter valve 77 may be diverted through port 82 to suds reservoir 83 by energization of solenoid 97 or may be discharged through port 85 to an external drain as shown by the dotted arrows in hoses 84 and 86, respectively. With solenoid 97 energized and the pump impeller 73 rotating in the direction of the solid arrows of FIGURE 3, it will be apparent that fluid within reservoir 83 will be pumped through valve 77 and pump 26 towards tub 44.

In order to operate the described apparatus in a predetermined sequence, the electrical control system of FIGURE 5 is utilized. That figure represents a wiring diagram interconnecting the various components controlled by a time mechanism 100 mounted on cabinet 22 of FIGURE 1. Timer 100 is diagrammatically illustrated in FIGURE 6 as comprising a drive motor 101, a manually adjustable knob 102 for positioning the initial settings of the control cams $C_1$, $C_2$, $C_3$, $C_4$, and $C_5$. The conventional overrunning clutch arrangement permitting manual adjustment of these cams relative to timer drive motor 101 is not shown. These cams actuate the respective switches $S_1$, $S_2$, $S_3$, $S_4$, and $S_5$ each of which, with the exception of switch $S_4$, is a single pole double throw switch having upper and lower contacts engageable by a spring contact arm biased towards the axis of rotation of the various cams. Switch $S_4$ is a single pole single throw switch having a lower contact engaged by a similarly biased contact arm.

Since the sequential operation of the control system is more easily comprehended by the substitution of an equivalent drum timer development $100_a$ as that indicated in the upper portion of FIGURE 5, the timer 100 of FIGURE 6 has been schematically illustrated as a 36 minute timer in FIGURE 5 in that manner. It will be noted that the left lead in wires to the timer development $100_a$ correspond to the left lead in wires to timer 100 in FIGURE 6 while the right lead in wires to timer development $100_a$ correspond to those leading into the right side of timer 100. Timer 100 in FIGURE 6 is shown in the 0 minute setting corresponding to the same time instant as that indicated at the extreme left side of timer development $100_a$ of FIGURE 5.

While timer 100 is rotated by timer motor 101 or the manually adjustable knob 102 in a clockwise direction to actuate switches $S_1$, $S_2$, $S_3$, $S_4$, and $S_5$ in response to the varying cam profiles shown in FIGURE 6, the electrical connections between the left and right lead in wires to the equivalent timer development $100_a$ may be pictured as being produced by a sweeping movement of the left lead in wires across development $100_a$.

These contacts are therefor produced by assuming that the left lead in wires move across the timer development $100_a$ making a connection with the respective right lead in wire or wires horizontally opposite the left lead in wire whenever the left lead in wire contacts the darkened areas appearing on development $100_a$.

For example, the upper lead in wire 104, which makes no contact during the first six minutes of the timer operation as cam $C_1$ rotates clockwise, will make a complete circuit through the right lead in wire 112 during the 6 to 16 minute interval while breaking for a half minute before completing a circuit through the right lead in wire 111 during the 16.5 to 22 minute interval. Likewise, neither of left lead in wires 105 or 106 makes contact with right lead in wire 113 during the first six minutes of operation, but as cam $C_2$ rotates clockwise wire 106 will make contact with wire 113 during the 6 to 18 minute interval before breaking for a half minute after which wire 105 will make contact with wire 113 for the short 18.5 to 19 minute interval.

In energizing the timer circuits, a source potential of approximately 115 volts alternating current is supplied to lines $L_1$ and $L_2$. Line $L_1$ connects to the thermo-protector 121 which automatically opens line $L_1$ upon the overloading of that particular line. Thermo-protector 121 is connected to line switch 122 carried in wire 113 which leads to the right side of the timer development $100_a$.

Line $L_2$ energizes the conventional water mixing fill valve 123 provided with the Hot and Cold solenoids connected to wires 117 and 105 respectively.

While shown by a schematic representation in the wiring diagram of FIGURE 5, mixing valve 123 is of conventional construction and includes separate hot and cold water inlets each of which leads into a mixing chamber and each of which is respectively controlled by a solenoid operated valve energized by the Hot and Cold solenoids indicated in FIGURE 5. These Hot and Cold solenoids control the flow of the source fluids into the mixing chamber of valve 123 which communicates with a single effluent conduit provided with a flow control regulating the discharge into tube 44 through appropriate hose connections. While eliminated in the sectional view of FIGURE 1 because of its normal location in the upper left rear corner of cabinet 22, mixing valve 123 in the preferred embodiment is provided with a single effluent port communicating with a mixing chamber and connected to a short length of flexible hose leading to a fill spout connected to and discharging through the top of crown 52. In this way the tub assembly is still free to move on the mounting dome 12 without restriction from the water inlet connections.

It will be apparent that the Hot solenoid will be energized from line $L_2$, through the Hot solenoid, right lead in wire 117, timer development $100_a$, line 109, line 108, back across timer development $100_a$, line 116, line switch 122 controlled by the axial movement of the adjustable control knob 102, thermo-protector 121 and line $L_1$. Similarly, the Cold solenoid is energized from line $L_2$, through the Cold solenoid, through left lead in wire 105, timed development $100_a$, line 113, line switch 122, thermo-protector 121 and line $L_1$.

With these connections alone the Hot and Cold solenoids, each of which has separate actuating switches as schematically illustrated by development $100_a$, will be energized according to that development chart sequence. For example, this will produce a hot water flow during the initial fill period during the 1 to 6 minute interval as well as producing a short cold rinse during the 18.5 to 19 minute interval of the first spin period. Since mixing valve 123 is timer operated and has a metered flow through its single effluent port, the simultaneous energization of the Hot and Cold solenoids will produce warm water at the same rate of flow as would be produced by the energization of one of these solenoids alone. An example of this metered flow of warm water occurs during the 22.5 to 27 minute interval constituting the second fill period.

However, since there are occasions when the use of hot water might be damaging to the fabrics to be cleaned, the temperature selector switch 124 connected across line 105 and 117 is provided. The closing of this switch, which is shown in the Hot position in FIGURE 5, moves the switch into the Warm position and places the Hot and Cold solenoids of valve 123 in parallel. This parallel connection causes the Hot and Cold solenoids to be energized together to produce a flow of warm water into tub 44 whenever the timer 100 normally energized either one or the other of these solenoids when switch 124 was in its open position.

Timer motor 101 which is energized from a 0 to 34.5 minute interval is energized through the following circuit. Line $L_2$ constitutes one side of the energizing line which connects to line 114 at the right side of development $100_a$. Line 114 in turn joins the short lead 119 which connects to line 111 at the upper right side of the timer development $100_a$. Line 111 leads through the timer motor 101 which is connected to line 109 at the left side of the timer development $100_a$. Stub line 108, connected to line 109, leads into the timer development $100_a$, across the longest darkened area of that timer development and connects to line 116 which leads to line $L_1$ through line switch 122 and thermo-protector 121.

Reversible motor 15 includes start winding 125, centrifugal switch 126, run winding 127 and capacitor 128 in series with start winding 125.

The power path to run winding 127 may be traced by starting from line $L_2$, then passing through run winding 127, up to right lead in wire 115, down to wire 118, left across timer development $100_a$ to conductor 109, then up the short jumper wire 108 and across timer development $100_a$ to conductor 116 which leads to line $L_1$ through line switch 122 and thermo-protector 121.

Since motor 15 rotates one direction during the agitation intervals of 6 to 16 minutes and 27 to 29 minutes and then reverses to rotate in the opposite direction during the centrifuging operations occurring during intervals of 16.5 to 22 minutes and 29.5 to 34.5 minutes, the connections to start winding 125 must be reversed with respect to the run winding 127 to achieve this reversal of rotation.

During the agitation periods, start winding 125 is energized through line $L_2$, up to right lead in wire 114, left across timer development $100_a$ to conductor 107 leading to the lower side of start winding 125, through start winding 125, through centrifugal switch 126, capacitor 128, line 104, then right across timer development $100_a$ to conductor 112, down to conductor 118, left across timer development $100_a$ to conductor 109, up wire 108, back across timer development $100_a$ to wire 116 which passes through line switch 122 and thermo-protector switch 121 to line $L_1$. Energization of start winding 125 through this circuit, which lasts only for a short interval before centrifugal switch 126 opens the start circuit, causes motor 15 to rotate in a counterclockwise direction as viewed from the bottom of FIGURE 1.

During the spin periods when motor 15 rotates in a clockwise direction as viewed from the bottom of FIGURE 1, power is supplied to start winding 125 through line $L_2$, conductor 114, up line 119 to conductor 111, across timer development $100_a$ to wire 104 which leads back to capacitor 128, through centrifugal switch 126, to the top of start winding 125, through start winding 125, up to conductor 107, then right across timer development $100_a$ to conductor 115 which leads back down to conductor 118, then left across timer development $100_a$ to wire 109, up to jumper wire 108, right across timer development $100_a$ to wire 116 then to line switch 122, thermo-protector switch 121 and back to line $L_1$. While these circuits do appear to be rather circuitous, it will be apparent from this description that the current flow through start winding 125 will be in opposite directions during the agitate and spin periods.

Diverter valve 77, which has its lower end connected to line $L_2$, is energized through the suds switch 130 which in turn leads to the conductor 106. Power flows through wire 106 across timer development $100_a$ to wire 113 which leads to line $L_1$ through line switch 122 and thermo-protector 121.

It will be apparent that until valve 77 is energized through the series switches 130 and the switch ($S_2$) represented between conductor 106 and conductor 113, tub 44 will always communicate with the exterior drain through the deenergized diverter valve 77 due to the bias of spring 95. Assuming line switch 122 and thermo-protector switch 121 closed, two conditions must be satisfied before the diverter valve 77 can be energized to permit communication between tub 44 and reservoir 83 through diverter valve 77. First, the suds switch 130 must be closed, and secondly, the timer 100 must establish contact between conductors 106 and 113. Timer 100, of course, establishes the contact between the conductors 106 and 113 during the 6 to 18 minute time interval as apparent from timer development $100_a$ in FIGURE 5. It should be apparent then that this particular time interval represents the only period that there may be fluid flow between reservoir 83 and tub 44 in this particular embodiment. The two-way centrifugal pump 16 controls the direction of water flow during that time interval.

In operation, with the thermo-protector switch 121 and line switch 122 closed subsequent to the insertion of fabrics and detergent to basket 53, timer motor 101 is energized by the rotation of control knob 102 past the 0 timer setting to energize timer motor 101 in order for timer motor 101 to rotate cams $C_1$, $C_2$, $C_3$, $C_4$ and $C_5$ and actuate switches $S_1$, $S_2$, $S_3$, $S_4$ and $S_5$ in the sequence indicated by the timer development $100_a$ of FIGURE 5.

Assuming that the timer control knob 102 has been turned just sufficiently past the zero setting to actuate timer motor 101, that motor will be actuated for approximately one minute before the mixing valve 123 is energized during the 1 to 6 minute interval to fill tub 44 with either hot or warm water depending upon whether or not the temperature selector switch 124 is open or closed. As previously stated, tub 44 is meter filled from mixing valve 123 and receives the same amount of water regardless of whether or not one or both of the solenoids of valve 123 is energized during this fill period.

At the end of the 1 to 6 minute interval, start winding 125 is energized through timer lead in wires 104 and 112, 107 and 114, 108 and 116, and 109 and 118 through the circuit path previously set forth in this specification. Run winding 127 is energized through the lead in wires 108 and 116 and through wires 109 and 118 also as previously set forth. This causes the double pulley 21 of motor 15 to rotate in a counterclockwise direction as viewed from bottom of FIGURE 1 to cause an oscillation of agitator 57 to produce the required agitation of the fabrics within basket 53.

This rotation of double pulley 21 also causes pump pulley 20 to rotate in the same direction and drive impeller 73 which is carried on the same shaft as pulley 20. This causes pump 26 to tend to pump toward tub 44 in the direction of the solid arrows appearing in drain hose 51 of FIGURE 1. However, since valve 77 is deenergized preventing any communication between tub 44 and reservoir 83, assuming, of course, that suds switch 130 is open, and since no fluid is pumped back through drain hose 86, this pumping action merely acts as a valve and prevents water from gravitating down drain hose 51 regardless of the position of drain hose 86 during this period.

At the end of the 6 to 16 minute interval ending the first agitation period, motor 15 is deenergized for a half minute allowing it to come to a full stop before being reversed to commence the first spin period occurring during the 16.5 to 22 minute interval. While the run winding 127 of motor 15 is energized through the same circuit as during the first agitation period, the start winding 125 is energized through the lead in wires 104 and 111, 107 and 115, 108 and 116, and 109 and 118 as set forth in another part of this specification. The reversal of double drive pulley 21 reverses the rotation of the drive assembly input pulley 17 to cause shafts 37 and 38 to rotate in unison in a clockwise direction as viewed from the bottom of FIGURE 1 to spin basket 53 and agitator 57 in unison within tub 44 to accomplish the desired fluid extraction through the cylindrical side wall 55 of basket 53.

This reversal of rotation of pulley 21 also reverses pump pulley 20 and allows pump impeller 73 to pump the washing fluid from tub 44 and, since valve 77 is deenergized due to suds switch 130 being in its open position, to drain hose 86 to an external drain.

It will be apparent from timer development $100_a$ of FIGURE 5 that a spray rinse will take place during the 18.5 to 19 minute interval. If the water temperature switch 124 is open (in the Hot position), only the Cold solenoid of valve 123 will be energized and will produce a cold spray during that interval while if switch 124 is closed placing the solenoids of valve 123 in parallel, both will be energized and the rinse will be of warm water. At the conclusion of the 16.5 to 22 minute interval, motor 15 will be deenergized terminating the driving power to pulleys 17 and 20.

With the energization of one or both of the solenoids of mixing valve 123, depending upon the positioning of switch 124, water will again be supplied to tub 44 on a time fill basis during the second fill period which lasts from the 22.5 to 27 minute interval. Since, in this particular embodiment, motor 15 is deenergized during this second fill period and since no valve has been provided in hose 51, the gravitational flow of fluid from tub 44 is prevented by merely elevating drain hose 86 above the level of the fluid retained in tub 44.

Following the conclusion of this second fill period, motor 15 is again energized for two minutes in a counterclockwise direction to oscillate agitator 57 in the fresh water to free the fabrics within the basket of their retained suds. This constitutes the deep rinse period which is concluded at the end of minute 29.

After another half minute has elapsed, motor 15 is energized in a clockwise direction to spin basket 53 free of this rinse water to place the fabrics retained in basket 53 in a damp dry condition. With this reversal of direction of motor 15, pump 16 also reverses and pumps the rinse fluid through the deenergized valve 77 and drain hose 86. All circuits are deenergized terminating the complete washing cycle following minute 34.5 as apparent from timer development $100_a$ in FIGURE 5.

Now, assuming that switch 130 is closed by moving it into the Save Suds position, the operation of the washing machine during the 0 to 6 minute interval will be identical to that previously described when switch 130 was in the Off or open position. With the beginning of the wash period at minute 6, valve 77 is energized through lead in wires 106 and 113 to establish communication between reservoir 83 and tub 44 by way of the hoses 84 and 51. However, since pump 16 tends to pump toward tub 44 during this wash period lasting from the 6 to 16 minute interval, no fluid will flow from tub 44 to suds reservoir 83 during the period.

However, when motor 15 is deenergized following that agitation period and is reversed at the beginning of the first spin period, pump 16 does pump the suds contained in tub 44 to the suds reservoir 83 by way of port 82 of the energized diverter valve 77. This fluid transfer from tub 44 to reservoir 83 takes slightly over a minute at the maximum and accounts for the reason that diverter valve 77 is deenergized at the beginning of the 18 minute interval and allows diverter valve 77 to establish communication between tub 44 and reservoir 83 for only a minute and one-half while pump 16 is pumping toward reservoir 83. With the deenergization of diverter valve 77, the slight amount of residual fluids extracted from the fabrics during the remaining part of the first spin period will pass to the drain through hose 86. From that point on the cycle, the operation of the machine utilizing this suds system is identical to that previously explained with the suds switch 130 being in its Off or open position.

While switch 130 may be opened prior to the very next washing cycle so as to purposely delay reuse of the suds in suds reservoir 83 until a number of cycles later, it will be assumed for the purpose of explanation that the suds in reservoir 83 will be used in the first washing operation of the subsequent cycle.

In that case suds switch 130 remains in its closed position. Timer knob 102 is then rotated past the 0 to 6 minute interval and allowed to start operation at the 6 minute mark. This, of course, omits the time fill period and immediately starts motor 15 rotating in a counterclockwise direction to oscillate agitator 57 and to cause pump 16 to pump toward tub 44. While there is a momentary agitation without washing fluid within tub 44, pump 16 immediately pumps suds from suds reservoir 83 to tub 44 and fills it with the suds from that reservoir so that there is agitation in the sudsy fluid for approximately 14 minutes before motor 15 is deenergized.

If suds switch 130 is permitted to remain in its save suds or closed position, it will be apparent that the same suds will be returned to the suds reservoir 83 during the 16.5 to 18 minute interval of the following first spin period in the same manner as when the suds were originally saved by diversion to reservoir 83.

However, if after the minute or so taken at the beginning of the agitation cycle for the return of the suds from reservoir 83 to tub 44, the operator wishes to divert the reused suds to the external drain at the beginning of following first spin period, switch 130 may be thrown into its Off or open position to deenergize diverter valve 77. Of course, after the suds have been transferred from reservoir 83 to tub 44 at the beginning of the wash period, it makes no difference as to the positioning of diverter valve 77 during the remainder of the agitation period since pump 16 pumps towards tub 44 during the remaining part of that wash period.

This machine, then, is capable of washing fabrics and disposing of the suds utilized during the wash period in a conventional manner if the operator so desires. It is also capable of diverting the suds of the first wash period into a suds reservoir for reuse during the next sequential or any other predetermined subsequent cycle of operations depending upon the option exercised by the operator.

Though only one embodiment of my invention has been shown in the accompanying drawings, it is understood that modifications of the embodiment may be made without departing from the scope of my invention as set forth in the following claims.

I claim:

1. In a washing machine for performing at least one washing operation and one fluid extraction operation and capable of cooperating with a fluid reservoir for storing washing fluid from one washing operation for reuse during a subsequent washing operation, means for performing said washing and extraction operations including a tub, and agitation means within said tub, reversible driven means, a reversible motor rotatable in one direction to effect a washing operation within said tub through said driven means and rotatable in a reverse direction to effect through said driven means an extraction operation within said tub, energizing circuits including timer means controlling said reversible motor over a cycle of programmed sequence, a fluid outlet in said tub, a two-way pump driven by said reversible motor and having first and second discharge openings, means connecting said first discharge opening to said fluid outlet in said tub, a diverter valve having first, second and third ports and a movable valve element having a first position in which said first port communicates with said second port and a second position in which said first port communicates with said third port, means connecting said second discharge opening of said pump to said first port of said diverter valve, said second port of said diverter valve constituting a drain port for fluid discharged from said tub through said diverter valve, means for connecting said third port of said diverter valve to said fluid reservoir, said reversible motor causing said pump to pump toward said tub during said washing operation and away from said tub during said extraction operation, and control means cooperating with said timer means for moving said valve element from said first position into said second position to establish communication between said tub and said reservoir during a predetermined portion of said cycle.

2. In a washing machine for performing at least one washing operation and one fluid extraction operation and capable of cooperating with a fluid reservoir for storing washing fluid from one washing operation for reuse during a subsequent washing operation, means for performing said washing and extraction operations including a tub and agitation means within said tub, a reversible input member rotatable in one direction to effect a washing operation and rotatable in a reverse direction to effect an extraction operation, a reversible motor driving said reversible input member, energizing circuits including timer means controlling said reversible motor in a programmed sequence, a fluid outlet in said tub, a two-way pump driven by said reversible motor and having first and second discharge openings, means connecting said first discharge opening to said fluid outlet in said tub, a diverter valve having first, second and third ports and a movable valve element normally biased into a first position in which said first port communicates with said second port, said movable element having a second position in which said first port communicates with said third port, means connecting said second discharge opening of said pump to said first port of said diverter valve, said second port of said diverter valve constituting a drain port for fluid discharged from said tub through said diverter valve, means for connecting said third port of said diverter valve to said fluid reservoir, said reversible motor causing said pump to pump toward said tub during said washing operation and away from said tub during said extraction operation, and control means cooperating with said timer means for moving said valve element into said second position to establish communication between said tub and said fluid reservoir during said washing and extraction operations.

3. In a washing machine for performing at least one washing operation and one fluid extraction operation and capable of cooperating with a fluid reservoir for storing washing fluid from one washing operation for reuse in a subsequent washing operation, means for performing washing and extraction operations including an imperforate container and agitation means within said container, a reversible input member rotatable in one direction to effect said washing operation and rotatable in a reverse direction to effect said fluid extraction operation, a reversible motor driving said reversible input member; energizing circuit including timer means controlling said motor in a programmed sequence, a fluid outlet in said imperforate container, a two-way pump having first and second discharge openings, means connecting said first discharge opening to said fluid outlet in said imperforate container, a diverter valve having first, second and third ports and a movable valve element normally biased into a first position in which said first port communicates with said second port and having a second position in which said first port communicates with said third port, means connecting said second discharge opening of said pump to said first port of said diverter valve, said second port of said diverter valve constituting a drain port for fluid discharged from said tub through said diverter valve when said valve element is in said first position during said extraction operation, means for connecting said third port of said diverter valve to said fluid reservoir, said reversible motor causing said pump to pump toward said imperforate container during said washing operation and away from said imperforate container during said extraction operation, and a presettable control cooperating with said timer means for moving said valve element into said second position to establish communication between said imperforate container and said fluid reservoir during said washing and extraction operations.

4. In a washing machine for performing at least one washing operation and one fluid extraction operation and capable of cooperating with a fluid reservoir for storing washing fluid from one washing operation for reuse in a subsequent washing operation, an imperforate tub for receiving washing fluid, a rotatable perforate basket mounted within said tub for retaining fabrics to be washed and for centrifugally extracting fluids therefrom during said extraction operation, agitating means within said basket for agitating said fabrics in said washing fluid during said washing operation, reversible driven means to rotate said basket during said extraction operation when rotated in one direction and to operate said agitating means during said washing operation when reversed and rotated in a second direction, a reversible motor connected to said reversible means, energizing circuits for said machine including timer means controlling said motor in a programmed sequence, a fluid outlet in said tub, a two-way pump having first and second discharge openings, said first discharge opening being connected through a first conduit to said fluid outlet in said tub, a diverter valve having first, second and third ports and a movable valve element normally biased into a first position in which said first port communicates with said second port and having a second position in which said first port communicates with said third port, a second conduit interconnecting said second discharge opening of said pump and said first port of said valve, said second port of said valve constituting a drain port for fluid discharged from said tub through said diverter valve when said valve element is in said first position, a third conduit connected to said third port of said valve for communication with said fluid reservoir, said reversible motor causing said pump to pump toward said tub during said washing operation and away from said tub during said fluid extraction operation, and a presettable control cooperating with said timer means for moving said valve element into said second position to establish communication between said tub and said fluid reservoir during said washing and extraction operations.

5. In a washing apparatus for performing a washing operation and a fluid extraction operation and capable of cooperating with a fluid reservoir for storing washing fluid from one washing operation for reuse in a subsequent washing operation, means for performing said washing and extraction operations including a tub and agitation means within said tub, driven means rotatable in one direction to effect a washing operation and rotatable in a reverse direction to effect an extraction operation, a reversible motor driving said reversible driven means, conduit means connected to said tub for interconnecting said tub and said reservoir, pump means communicating with said conduit and operated by said reversible motor for pumping fluid from said reservoir toward said tub when said motor is rotated in said first direction during said washing operation and for pumping fluid from said tub toward said reservoir when said motor is rotated in said reverse direction during said extraction operation, and control means controlling the operation of said motor during said washing and extraction operations.

6. In a washing apparatus for performing a washing operation and a fluid extraction operation and capable of cooperating with a fluid storage reservoir for storing washing fluid from one washing operation for reuse in a subsequent washing operation, means for performing said washing and extraction operations including a tub and agitation means within said tub, driven means rotatable in one direction to effect a washing operation within said tub and rotatable in a reverse direction to effect a fluid extracton operation in said tub, a reversible motor driving said reversible drive means, conduit means connected to said tub for interconnecting said tub and said fluid storage reservoir for storing fluid extracted from said tub during said extraction operation, valve means connected in said conduit means interconnecting said reservoir and said tub to control communication therebetween, pump means connected in said conduit means and operated by said motor for pumping fluid from said reservoir toward said tub when said motor is rotated in said first direction during said washing operation and for pumping fluid from said tub toward said reservoir when said motor is rotated in said reverse direction during said extraction operation, and means controlling the operation of said valve means and said motor during said washing and extraction operations.

7. In a washing apparatus for performing a washing operation and fluid extraction operation and capable of cooperating with a fluid storage reservoir for storing washing fluid from one washing operation for reuse in a subsequent washing operation, means for performing a washing operation and a fluid extraction operation including a tub and agitation means within said tub, driven means rotatable in one direction to effect a washing operation within said tub and rotatable in a reverse direction to effect a fluid extraction operation from said tub, a reversible motor connected to said driven means to reversibly rotate said driven means, conduit means connected to said tub for interconnecting said tub and said reservoir, a diverter valve including a drain port connected in said conduit means, said diverter valve further including control means for selectively establishing communication between said [tube] *tub* and either said reservoir or said drain port, pump means operated by said reversible motor and connected in said conduit means for pumping fluid toward said tub when said motor is rotated in said first direction during said washing operation and for pumping fluid away from said tub when said motor is rotated in said reverse direction during said extraction operation, and means for controlling the operation of said control means and said motor during said washing and extraction operations.

8. In a washing apparatus for performing a washing operation and a fluid extraction operation and capable of cooperating with a fluid storage reservoir for storing washing fluid from one washing operation for reuse in a subsequent washing operation, means for performing said washing and extraction operations including a tub, agitation means within said tub, and driven means rotatable in a first direction to effect a washing operation within said tub and rotatable in a reverse direction to effect a fluid extraction operation from said tub, a reversible motor drivably connected to said driven means, conduit means connected to said tub for interconnecting said tub and said reservoir, a diverter valve including a drain port connected in said conduit means, said diverter valve including valve means for selectively establishing communication between said tub and either said reservoir or said drain port, bias means for urging said valve means into a first position to establish communication between said tub and said drain port, control means for overcoming said bias means to move said valve means into a second position to establish communication between said tub and said reservoir, pump means operated by said motor and connected to said conduit means for pumping fluid toward said tub when said motor is rotated in said first direction during said washing operation and for pumping fluid away from said tub when said motor is rotated in said reverse direction during said extraction operation, and means for controlling said control means and said motor during said washing and extraction operations.

9. In a washing machine for performing a washing operation and a fluid extraction operation and capable of cooperating with a fluid storage reservoir for storing washing fluid from one washing operation for use in a subsequent washing operation, means for performing said washing and extraction operations including a tub, agitation means within said tub, reversible driven means rotatable in a first direction to effect a washing operation within said tub and rotated in a reverse direction to effect a fluid extraction operation from said tub, a reversible motor drivably connected to said driven means, conduit means connected to said tub for interconnecting said tub and said reservoir, a diverter valve including a drain port connected in said conduit means, said diverter valve including valve means for selectively establishing communication between said tub and either said reservoir or said drain port, bias means for urging said valve means into a first position to establish communication between said tub and said drain port, pump means operated by said motor and connected in said conduit means for pumping fluid toward said tub when said motor is roated in said first direction during said washing operation and for pumping fluid away from said tub when said motor is rotated in said reverse direction during said extraction operation, timer means controlling said motor, and a manually operable switch cooperating with said timer means for overcoming said bias means to move said valve means into a second position to establish communication between said tub and said reservoir at predetermined periods of operation of said washing apparatus.

10. In a washing apparatus for performing a washing operation and fluid extraction operation and capable of cooperating with a fluid storage reservoir for storing washing fluid from one washing operation for reuse during a subsequent washing operation, means for performing said washing and extraction operations including a tub and agitation means and extraction means within said tub, a reversible driven means rotatable in one direction to effect through said agitation means a washing operation and rotatable in a reverse direction to effect through said extraction means an extraction operation within said tub, a reversible pump, a reversible motor driving said pump and said driven means, a conduit connected between said tub and said reversible pump, a diverter valve having a drain port therein, a second conduit connected to said reversible pump and to said diverter valve, a third conduit connected to said diverter valve for interconnecting said diverter valve and said storage reservoir, a valve element in said diverter valve having a first position establishing communication between said tub and said drain port and a second position establishing communication between said tub and said reservoir, and a control means controlling the operation of said motor and said valve element during said washing and fluid extraction operations.

11. In a washing apparatus for performing a washing operation and a fluid extraction operation and capable of cooperating with a fluid storage reservoir for storing washing fluids from one washing operation for reuse during a subsequent washing operation, means for performing said washing and extraction operations including a tub and agitation means and extraction means within said tub, a reversible input member rotatable in one direction to effect through said agitation means a washing operation and rotatable in a reverse direction to effect through said extraction means an extraction operation within said tub, a reversible pump, a reversible motor driving said pump and said reversible input member, a conduit connected between said tub and said reversible pump, a diverter valve having a drain port therein, a second conduit connected between said reversible pump and said diverter valve, a third conduit connected to said diverter valve for interconnecting said diverter valve and said storage reservoir, a valve element in said diverter valve having a first position establishing communication between said tub and said drain port and having a second position establishing communication between said tub and said reservoir, electrical means including switch means for shifting said valve element into said positions, and control means controlling the operation of said motor and cooperating with said switch means for controlling said valve element during said fluid extraction operations.

*12. In a washing apparatus for performing a washing operation and a liquid extraction operation, means for performing said washing and extraction operations including a tub and agitation means within said tub, driven means rotatable in one direction to effect a washing operation and rotatable in a reverse direction to effect an extraction operation, a reversible motor driving said reversible driven means, conduit means connected to said tub for conducting liquid from said tub to an external drain, pump means communicating with said conduit means and operated by said reversible motor for pumping toward said tub when said motor is rotated in said first direction during said washing operation and for pumping liquid from said tub to said external drain when said motor is rotated in said reverse direction during said extraction operation, and control means controlling the operation of said motor during said washing and extraction operations.*

*13. A clothes washing machine comprising a rotatably mounted perforate clothes receptacle; means for effecting movement of clothes and liquid in said clothes receptacle; an imperforate tub substantially surrounding said clothes receptacle so as to retain liquid within said clothes receptacle, said tub having a drain opening formed therein; a reversible rotary pump having first and second openings, said pump drawing in liquid through said first opening and discharging it through said second opening when rotated in one direction, said pump drawing in liquid through said second opening and discharging it through said first opening when rotated in the opposite direction; a common reversible drive motor for said pump, said clothes receptacle, and said movement effecting means, operation of said motor in a first direction rotating said pump in said one direction and operating said movement effecting means, operation of said motor in a second opposite direction rotating said pump in said opposite direction and rotating said clothes receptacle at a centrifuging speed; first conduit means connected at one end to said first pump opening and adapted to discharge liquid from its other end into a drain, and a second conduit means connected at one end to said second opening and at its other end to said drain opening.*

*14. The apparatus defined in claim 13 wherein said clothes receptacle is mounted for rotation on a substantially vertical axis and said movement-effecting means comprises an agitator member extending up into said clothes receptacle and movable therewithin.*

(References on following page)

References Cited in the file of this patent or the original patent

UNITED STATES PATENTS

| | | |
|---|---|---|
| 1,349,370 | Dawson | Aug. 10, 1920 |
| 2,161,604 | Watts | June 6, 1939 |
| 2,562,610 | Geldhof et al. | July 31, 1951 |
| 2,604,497 | Morrison | July 22, 1952 |
| 2,642,085 | Geldhof et al. | Jan. 16, 1953 |
| 2,660,043 | Geldhof | Nov. 24, 1953 |
| 2,666,315 | Abresch | Jan. 19, 1954 |
| 2,669,932 | Rauscher | Feb. 23, 1954 |
| 2,728,352 | Sanders | Dec. 27, 1955 |
| 2,764,722 | McKeown | Sept. 25, 1956 |
| 2,942,446 | Platt et al. | June 28, 1960 |